Jan. 10, 1950 R. W. DINZL 2,493,805
INJECTION MOLDING MACHINE
Filed Jan. 28, 1947 5 Sheets-Sheet 1

INVENTOR
RICHARD W. DINZL
BY
Kenyon & Kenyon
ATTORNEYS

Patented Jan. 10, 1950

2,493,805

UNITED STATES PATENT OFFICE 2,493,805

INJECTION MOLDING MACHINE

Richard W. Dinzl, Westfield, N. J., assignor to The Watson-Stillman Co., Roselle, N. J., a corporation of New Jersey Application January 28, 1947, Serial No. 724,891

11 Claims. (Cl. 18—30)

This invention relates to injection molding machines.

In the conventional type injection molding machine, a charge of granular molding material is forced through a heated injection cylinder under high pressure by a plunger to plasticize the molding material and deliver it to a mold in which the material is maintained under high pressure over a period of time, after which the plunger is retracted and the material in the mold is allowed to cool for a further period of time while the plunger remains at rest and an additional charge of granular molding material is fed to the injection cylinder. The plunger is operated hydraulically and pumping equipment is employed to develop the hydraulic pressure required for operation thereof. The pumping equipment is actually made use of only during the injection and retraction stroke of the plunger but operates continuously. In large capacity machines, large pumping equipment and expensive heating equipment for the injection cylinder are required, thus adding materially to the initial cost as well as the operating cost of such machines. As between two machines of different capacities, the ratio of the initial cost and operating cost of the large capacity machine to the small capacity machine, materially exceeds the ratio of the capacities. It is therefore, of importance to a manufacturer of injection molding machines to minimize as much as possible the heating and power requirements of large capacity machines.

An object of this invention is an injection molding machine of such structure as to minimize its initial cost and power requirements and to make maximum utilization of its power equipment.

In a machine embodying the present invention, a charge of pre-plasticized molding material in small increments is supplied to the injection cylinder during the cooling period and the plasticized material is introduced into the injection cylinder in such manner as to effect retraction of the injection plunger. The pre-plasticized molding material increments are supplied to the injection cylinder from a small auxiliary heating cylinder into which granular molding material is introduced and forced through said cylinder by hydraulic pressure developed by the pump equipment during the period which in injection molding machines heretofore used the pumping equipment was idling. During its passage through the auxiliary cylinder, the molding material is partially or completely plasticized. The pressure required for operating the injection plunger is less than would be the case if a charge of granular molding material were introduced into the injection cylinder and such equipment is utilized during throughout substantially the entire injection cyle. The heating unit required for pre-plasticizing the molding material is correspondingly smaller and the heating unit for the injection cylinder need be only sufficient for maintaining the plasticized molding material at the proper temperature rather than supplying sufficient heat to render the material plastic. Since, with the molding material pre-plasticized, a lower injection pressure is required to advance the pre-plasticized molding material than would otherwise be the case, the injection cylinder may be of less strength and of correspondingly lower cost and the pumping equipment necessary to develop the plunger-operating pressure may be smaller.

Other objects, novel features and advantages of this invention will become apparent from the following specification and accompanying drawings, wherein.

A frame 5 is formed with two stationary heads 6 and 7 between which extend guide rods 8. The head 6 supports an injection cylinder 9 having at one end a discharge nozzle 10. A platen 11 is slidably mounted on the rods 8 for movement toward and away from the nozzle 10 and a second platen 12 is slidably mounted on the rods 8 for movement toward and away from the platen 11. The platens 11 and 12 support die halves 13 and 14 of which the latter has a passageway adapted to register with the nozzle 10 in one position of the platen 11. In the wall of the cylinder 9, there is provided a lateral filling port 15 and a plunger 16 is mounted in said cylinder for reciprocation toward and away from said nozzle 10. The port 15 is located between the nozzle 10 and the nearest point of approach of the plunger 16 to the nozzle. Suitable means 9a are provided for heating the cylinder 9.

The frame 5 is provided with a third stationary head 17 which supports a filling cylinder 18 of materially less capacity than the cylinder 9 and having an outlet port 19 at one end and a lateral inlet port 20 in its curved wall. A hopper 21 is located above the cylinder 18 and has a chute 22 leading to the port 20. A torpedo 23, preferably of the design disclosed in applicant's co-pending application, Serial No. 624,448, filed October 25, 1945, now Patent No. 2,462,308, is arranged in the filling cylinder 18 between its inlet port 20 and its outlet port 19. A plunger 24 is mounted in the cylinder 18 for reciprocation toward and away from the torpedo and its path of movement is such that it covers the inlet port 20 on its forward stroke and uncovers said port on its rearward stroke. The outlet of the cylinder 9 is connected to the inlet 15 of the cylinder 18 by a nipple 25 connected between said cylinders in such manner as to permit slight relative movement of the two cylinders without breaking the connection between them. Suitable means 18a are provided for heating the cylinder 18.

Figure 1:
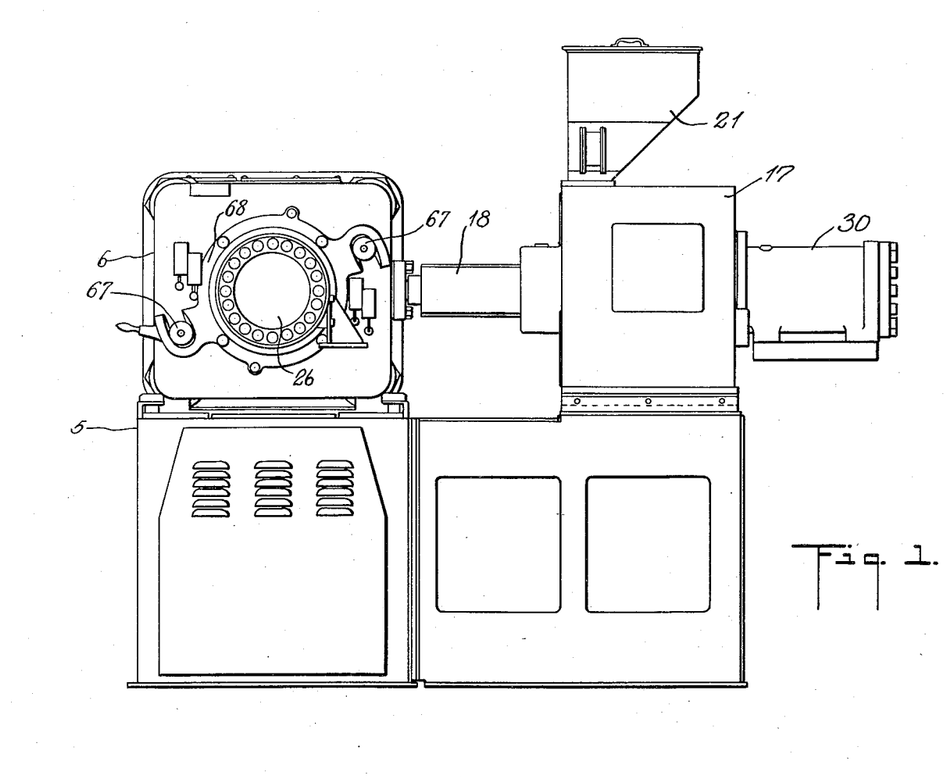
Fig. 1 is an elevation of an injection molding machine involving the invention.
Figure 2:
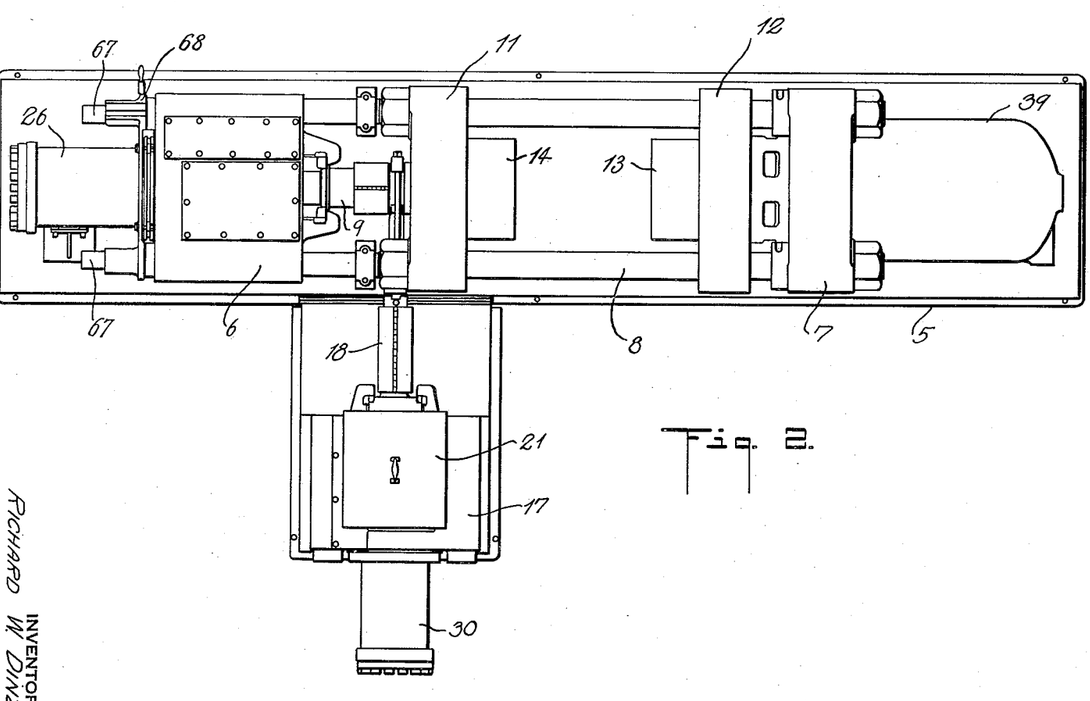
Fig. 2 is a plan view of Fig. 1.
Figure 3:
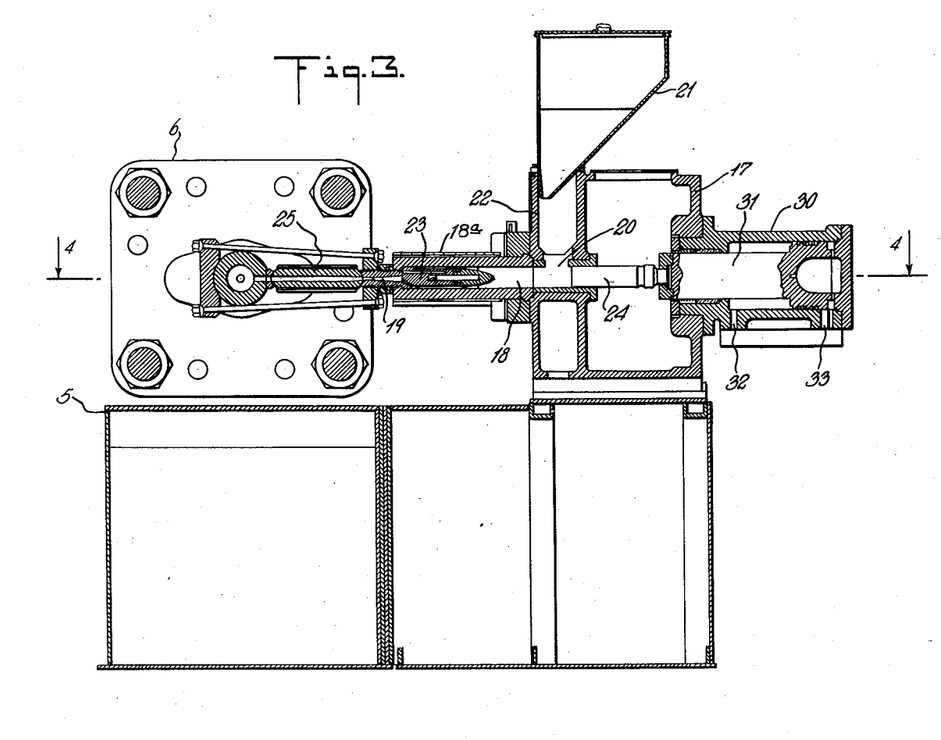
Fig. 3 is a section on the line 3—3 of Fig. 1.
Figure 4:
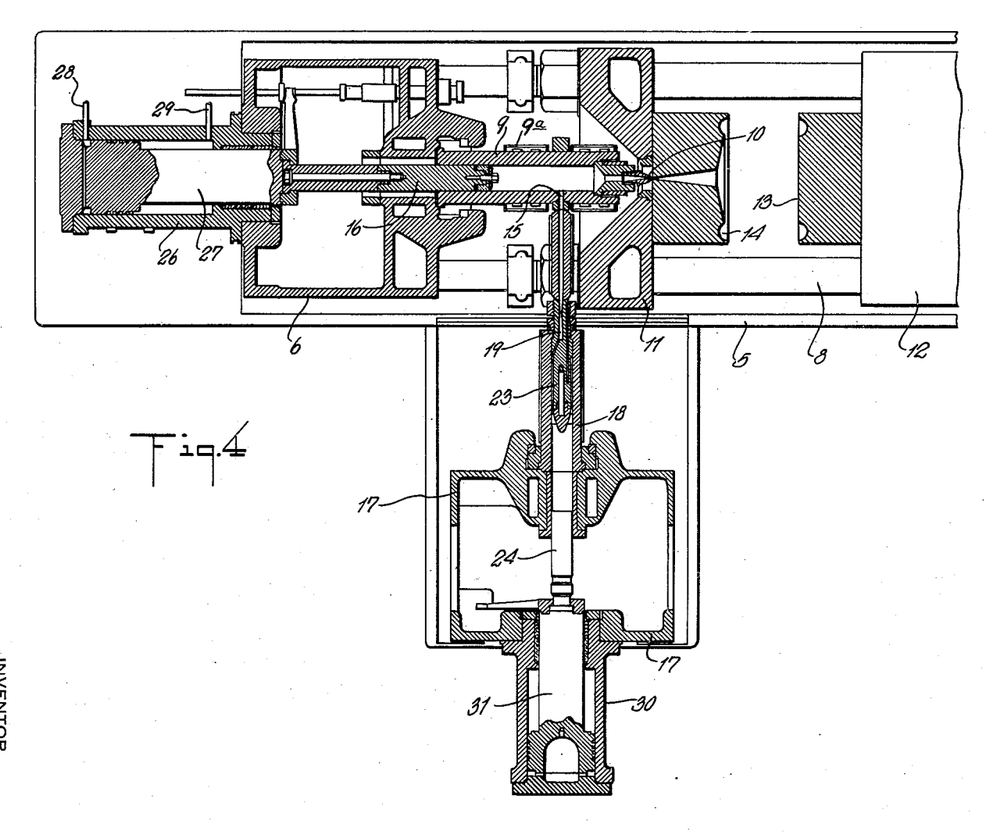
Fig. 4 is a section on the line 4—4 of Fig. 3.
Figure 5:
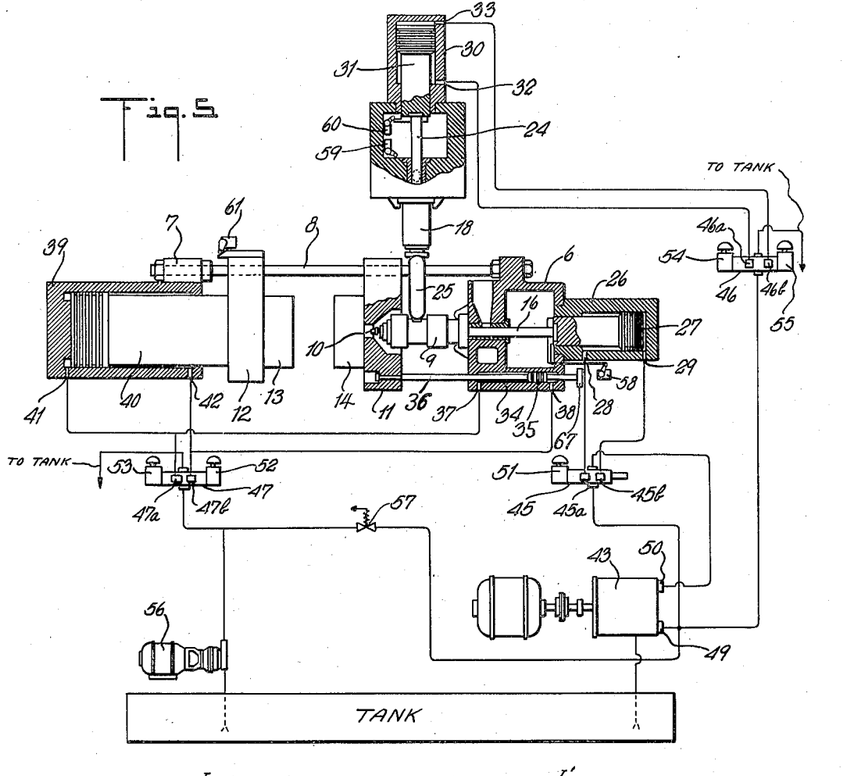
Fig. 5 is a hydraulic diagram.

A hydraulic motor 26 is supported by the head 6 and its piston 27 is connected to the plunger 16 to effect reciprocation thereof upon reciprocation of the piston 27 and the arrangement is such that the plunger 16 at no time closes the port 15. The cylinder of the hydraulic motor 26 is provided with two ports 28 and 29, by means of which hydraulic fluid is supplied to and withdrawn from opposite ends of the cylinder to effect reciprocation of the piston 27.

The head 17 supports a hydraulic motor 30, the piston 31 of which is connected to the plunger 24 to effect reciprocation thereof upon reciprocation of the piston 31. The cylinder of the hydraulic motor 30 is provided with ports 32 and 33 through which hydraulic fluid is supplied to and withdrawn from said cylinder to effect reciprocation of the piston 31.

In the head 6 are formed one or more hydraulic motors 34 each consisting of a cylinder containing a piston 35 connected by a rod 36 to the platen 11. The cylinder of the hydraulic motor 34 is provided with ports 37 and 38 through which hydraulic fluid is supplied to and withdrawn from said cylinder to effect reciprocation of the piston 35.

The head 7 supports a hydraulic motor 39 having a piston 40 connected to the platen 12 to effect reciprocation thereof upon reciprocation of the piston. The cylinder of the hydraulic motor 39 is provided with ports 41 and 42 through which hydraulic fluid is supplied to and withdrawn from said cylinder to effect reciprocation of the piston 40.

A pump 43 draws hydraulic fluid from a tank and discharges it under pressure for operating the hydraulic motors 26, 30, 34 and 39. The pump has a main outlet 49 in communication with the supply port of each of three four-way valves 45, 46, and 47, of which the valve 45 controls flow of hydraulic fluid to and from the hydraulic motor 26 and the valve 46 controls the flow of hydraulic fluid to and from the hydraulic motor 30 while the valve 47 controls the flow of hydraulic fluid to and from both the hydraulic motor 34 and the hydraulic motor 39. The valve 46 has ports 46a and 46b communicating respectively with the ports 32 and 33 of the hydraulic motor 30, while the valve 47 has a port 47a communicating with the ports 37 and 41 of the hydraulic motors 34 and 39, respectively, and a port 47b communicating with the ports 38 and 42 of the hydraulic motors 34 and 39 respectively. The pump 43 is a standard commercially available pump which is so constructed that it is supercharged by a small auxiliary pump (not shown) but integral with the main pump and the arrangement of the auxiliary pump is such that it produces low pressure at the port 50 which is in communication with the discharge port of the valve 45.

The valve 45 is equipped with a solenoid 51 which, when de-energized, sets the valve 45 in such condition that both the ports 28 and 29 of the hydraulic motor 26 are connected to the port 50 of the pump 43 and when energized sets the valve 45 in such position that the port 29 of the hydraulic motor 26 is connected to the pump port 49 and the port 28 of the hydraulic motor 26 is connected to the pump port 50. The valve 47 is equipped with two solenoids 52 and 53 and the arrangement is such that when both solenoids are de-energized, the valve 47 is set in such position that its inlet port communicates with its discharge port and both ports 47a and 47b are blocked; that when the solenoid 52 is energized, with the solenoid 53 de-energized, the valve 47 is set in such position that the port 49 of the pump 43 communicates with the ports 37 and 41 respectively of the hydraulic motors 34 and 39 with the remaining ports of said hydraulic motors communicating with the discharge port of the valve 47; and that, when the solenoid 53 is energized with the solenoid 52 de-energized, the valve 47 is set in such position that the port 49 of the pump 43 is in communication with the ports 38 and 42 of the hydraulic motors 34 and 39 respectively with the remaining ports of said hydraulic motors communicating with the discharge port of the valve 47. The valve 46 is equipped with two solenoids 54 and 55 and the arrangement is such that when both solenoids are de-energized, the valve 46 is set in such position that its inlet port communicates with its discharge port and both ports 46a and 46b are blocked; that when the solenoid 54 is energized with the solenoid 55 de-energized, the valve 46 is set in such position as to connect the pump port 49 to the port 33 of the hydraulic motor 30 with the port 34 connected to the discharge port of the valve 46; and that, when the solenoid 54 is energized with the solenoid 55 de-energized, the valve 46 is set in such position that the pump port 49 is connected to the port 32 of the hydraulic motor 30 with the port 33 connected to the discharge port of the valve 46.

A second pump 56 draws hydraulic fluid from the tank and supplies it to the inlet of the valve 47 at a higher pressure than hydraulic fluid is supplied to the valve 47 by the pump 43. A check valve 57 prevents flow of hydraulic fluid from the pump 56 to either the valve 45 or the valve 46.

Figure 6:
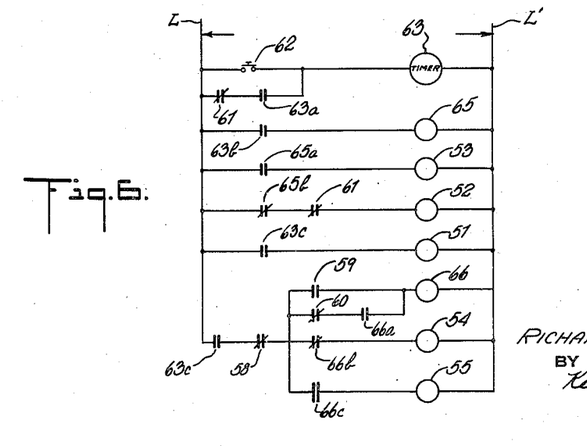
Fig. 6 is a wiring diagram.

A self-closing limit switch 58 is provided for actuation by the plunger 16, the arrangement being such that the limit switch is opened by the plunger at the limit of its retraction stroke. A self-opening limit switch 59 and a self-closing limit switch 60 are provided for actuation by the piston 31 of the hydraulic motor 30, the arrangement being such that the switch 59 is closed by the piston 31 at the end of its forward stroke and the switch 60 is opened by the piston 31 at the end of its retraction stroke. A self-closing limit switch 61 is provided for operation by the platen 12, the arrangement being such that the switch is opened by the platen 12 at the end of its retraction stroke. By suitable energization of the various solenoids, the platens 11 and 12 are actuated to engage the platen 11 with the nozzle 10 and to clamp the die halves 13 and 14 in mold-forming relation. The plunger 16 is advanced to inject molding material from the cylinder 9 through the nozzle 10 into the mold formed by the die halves without closing the lateral port 15 and during advance of the plunger 16, the plunger 24 is locked against movement. The plunger 24 is reciprocated after completion of the injection stroke of the plunger 16 with the die halves 13 and 14 clamped to introduce several small charges of plasticized molding material from the cylinder 18 into the cylinder 9 to recharge the cylinder 9 and return the plunger 16 to original position. Upon return of the plunger 16 to its original position, the plunger 24 is locked in whatever position it is when the plunger 16 reaches its original position. Thus, the plunger 24 prevents escape of plasticized molding material through the port 15 from the cylinder 9 during the injection stroke of the plunger 16. Upon each retraction stroke of the plunger 24, it uncovers the port 20 to admit a charge of granular solid molding material into the cylinder 18 and upon each advance stroke of the plunger 24, the newly admitted charge is advanced toward the torpedo 23 and a small amount of plasticized molding material is discharged through the nipple 25 into the injection cylinder 9. The return of the plunger 16 to its original position takes place during the curing period of the piece being molded and such period is longer than is necessary to introduce the required number of charges of plasticized molding material from the cylinder 18 into the cylinder 9 to recharge the latter. Upon completion of the curing period, the platens 11 and 12 are returned to their original positions to open the die halves and disengage the platen 11 from the nozzle. After removal of the molded piece, the machine is ready for another operation. The pump 56 supplies clamping pressure for the die halves, during the molding and curing periods.

Energization of the solenoids is effected by the electrical system of Fig. 6 in which L is one conductor and L' is the other conductor of a current supply. The conductor L is connected to the conductor L' through a starting switch 62 in series with a timer 63 and a shunt circuit around the switch 62 contains the limit switch 61 and the contact 63a of the timer 63. The conductor L is also connected to the conductor L' as follows: through the timer contact 63b and relay 65, through the normally open contacts 65a of the relay 65 and the solenoid 53, through the normally closed contacts 65b of the relay 65, limit switch 61 and solenoid 52, through the normally open contacts 63c of the timer 63 and the solenoid 51, through the timer contacts 63d, limit switch 58, the limit switch 59 and the relay 66. A shunt circuit around the switch 59 contains the limit switch 60 and the normally open contacts 66a of the relay 66. A shunt circuit around the switch 59 and the relay 66 includes the normally closed contacts 66b of the relay 66 and the solenoid 54, while still another shunt circuit around the switch 59 and the relay 66 includes the normally open contacts 66c of the relay 66 and the solenoid 55.

Assuming that the cylinder 9 contains a full charge of plasticized molding material with the plunger 24 in any position in the cylinder 18 and that the platens 11 and 12 are in their retracted positions, the operation of the device is as follows: The operator pushes the start button 62 which energizes the timer 63, the initial operation of which closes the contact 63a, but does not close the shunt around the starter button 62 as the limit switch 61 is held open by the platen 12.

Further advancement of the timer 63 closes the contacts 63b to energize the relay 65. Energization of the relay 65 closes the contacts 65a to energize the solenoid 53 and opens the contacts 65b to prevent energization of the solenoid 52, whereupon the valve 47 is set to deliver hydraulic fluid to the port 41 of the hydraulic motor 30 and permit discharge of hydraulic fluid from the port 38. Thereupon, the platen 11 advances toward the nozzle 10 and the platen 12 advances toward the platen 11 to close the dies 13 and 14. Advancement of the platen 12 releases the switch 61 to closed condition, thereby establishing a holding circuit for the timer through it and the timer contact 63a after which the starting switch 62 may be released. Further advancement of the platen 12 clamps the die 14 against the die 13 and as the clamping takes place, the pump 56, by virtue of its higher pressure takes over delivery of hydraulic fluid to the port 41 and operates against the check valve 57 to seal off the clamping circuit from the remainder of the machine.

Continued advancement of the timer closes the timer contacts 63c to energize the solenoid 51. Energization of the solenoid 51 sets the valve 45 to deliver hydraulic fluid from the pump 43 to the port 29 of the hydraulic motor 26 and permit the discharge of hydraulic fluid from the motor through the port 28, thereby causing advancement of the plunger 16 to discharge the plasticized molding material from the cylinder 9 into the mold. Advancement of the plunger 16 releases the limit switch 58 to closed position. By reason of both solenoids 54 and 55 being de-energized, the ports 46a and 46b of the valve 46 are blocked, thereby locking the piston 31 so that in the event the plunger 24 is in any position other than at the end of its retraction stroke, it is held in such position irrespective of the pressure applied to it by molding material in the cylinder 9. After completion of the injection stroke of the plunger 16, the timer contacts 63c open to de-energize solenoid 51, whereupon the valve 45 automatically is set in position to block off its inlet port and connect the ports 28 and 29 of the hydraulic motor 26 to the port 50 of the pump 43, thereby applying to both faces of the piston 27 the pressure existing at the port 50. Because of the different area of the two faces of the piston 27, the latter, as well as the plunger 16 is held at the end of its forward stroke until some greater force moves it back. Further advancement of the timer 63 closes the normally open contacts 63d, thereby closing a circuit through the limit switch 58, normally closed contacts 66b of the relay 66, and the solenoid 54. Energization of the solenoid 54 sets the valve 46 in position to supply hydraulic fluid to the port 33 of the hydraulic motor 30 and permit discharge of hydraulic fluid from the port 32, thereby advancing the plunger 24 to supply plasticized molding material from the cylinder 18 to the cylinder 9. Since the dies are closed and a piece has just been molded, the discharge nozzle 10 is plugged by molding material. The molding material being delivered to the piston 9 cannot escape through the nozzle and, therefore, forces the plunger 16 back against the low pressure existing on the rear face of the piston 27. The amount of plasticized molding material thus delivered is less than the capacity of the cylinder 9. When the piston 31 completes its forward stroke, it operates limit switch 59 to closed position, thereby energizing relay 66, energization of which closes its normally open contacts 66a, thereby locking the relay in actuated position through the switch 60. Actuation of the relay 66 also opens its normally closed contacts 66b and closes its normally open contacts 66c, thereby energizing the solenoid 55. Energization of the solenoid 55 shifts the valve 46 into condition to deliver hydraulic fluid from the pump 43 to the port 32 of the hydraulic motor 30 and permit discharge of hydraulic fluid through the port 33, thereby effecting retraction of the piston 31 and the plunger 34. Full retraction of the plunger 24 uncovers the port 20, permitting a new charge of molding material to fall in ahead of the plunger 24. Also, full retraction of the piston 31 operates the switch 60 to open position, thereby de-energizing relay 66. De-energization of the relay 66 closes the contact 66b to close the energizing circuit of solenoid 54 and opens the contacts 66c to de-energize the solenoid 55. The piston 31 again moves forward to deliver a charge of plasticized material into the cylinder 9. Reciprocation of the piston 31 continues until the plunger 16 is moved to a position in which it opens the switch 58. Opening of the switch 58 de-energizes both solenoids 54 and 55, whereupon the valve 46 assumes the position in which both the ports 32 and 33 of the hydraulic motor 30 are blocked, thus locking the plunger 24 against movement. The timer contact 63b now opens to de-energize the relay 65. De-energization of the relay 65 opens the contacts 65a and closes the contacts 65b, thereby de-energizing the solenoid 53 and energizing the solenoid 52 through the switch 61. Energization of the solenoid 52 sets the valve 47 to deliver hydraulic fluid to the ports 38 and 42 of the hydraulic motors 34 and 39 respectively, while permitting escape of hydraulic fluid through the ports 37 and 41, thereby retracting the platens 11 and 12 to open the dies. When the platen 12 completes its retraction, it operates the switch 61 to open position, thereby de-energizing the solenoid 52 and the timer 63, permitting the latter to reset in anticipation of the next cycle. Since both solenoids 52 and 53 are de-energized, the valve 47 is set in neutral in which condition, the delivery of the pumps is by-passed from the inlet port to the discharge port and thence to the tank. The machine is now ready for the next cycle.

The pistons 35 are provided with extensions projecting beyond the head 6 and the exposed end of each piston is equipped with an enlarged button 67. The head 6 supports a locking ring 68 (Fig. 1) movable into and out of position to fill in the space between the buttons 67 and head 6 to lock the platen 11 in engagement with the nozzle 10. With the locking ring 68 in operative position, the platen 11 is held stationary during the operation of the machine, but with the locking ring 68 in inoperative position, the platen 11 is reciprocated relative to the nozzle 10 during operation of the machine.

It is of course understood that various modifications may be made in the injection molding machine above described, without in any way departing from the spirit of the invention as defined in the appended claims.

A pre-plasticizing injection molding machine incorporating the principles disclosed hereinabove, inherently transfers the pre-plasticized molding material, through the nipple connection 25 and into the injection cylinder 9, with the material under compression during its transferring flow movement and continuously while in the injection cylinder. In effect, the pre-plasticizing plunger 24 incrementally effects injection molding of the plasticized material into the injection cylinder 9, with the injection molding pressure substantially equaling the force applied the injection plunger 16 by the piston 27 when the pump pressure is applied to both the ports 28 and 29. The flow-resistance provided by the connection 25 prevents the material backing therethrough from the injection cylinder, thus keeping the material under compression in this cylinder during reciprocation of the pre-plasticizing plunger.

Prior art injection molding machines, of this general type, incorporate an injection plunger reciprocator which can be controlled only to advance and return this plunger. The plunger-advancing force provides the full injection molding force, and no arrangement is provided for reducing this force. Therefore, the injection plunger must be fully withdrawn during charging of the injection cylinder, the pre-plasticising assembly or system therefor discharging into empty space. This space is in the injection molding cylinder and the latter is heated, as contrasted to the empty space in the die cavity where the desired injection molding is produced, the dies being customarily cold. Therefore, voids or gas bubbles form in the charge of the injection cylinder. This trouble has seriously interfered with the use of this type of machine.

Application of the principles of the present invention to a pre-plasticizing injection molding machine, inherently avoids the formation of voids or gas bubbles forming in the pre-plasticized material charged into the injection cylinder. Since such a machine, constructed in accordance with the present invention, keeps the pre-plasticized material under compression while it is moving into the injection cylinder, and since the latter is always kept completely filled with the material under compression, the described trouble is prevented.

The principles of the invention provide the added advantage that the volume of the injection molding charge, is measured in its pre-plasticized condition directly in the injection molding cylinder. The usual practice has been to charge measured volumes in the pre-plasticizing cylinder, this requiring compensation for the volume reduction resulting when granular thermo-plastic material is plasticized by the heat and pressure.

I claim:

1. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port and having a lateral port, a plunger reciprocable in said filling cylinder across the lateral port thereof, a molding material supply chute communicating with said filling cylinder lateral port, a source of hydraulic fluid under pressure, means for utilizing said hydraulic fluid to force said injection plunger toward the injection cylinder nozzle, means biasing the injection plunger against return movement after completion of the injection stroke, means effective upon completion of the injection stroke of the injection plunger to utilize said hydraulic fluid to effect reciprocation of the filling plunger thereby introducing plasticized molding material into said injection cylinder and causing return of the injection plunger under pressure exerted by the introduced molding material, and means effective upon completion of the return of the injection plunger to discontinue reciprocation of said filling plunger and lock the same against movement.

2. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port and having a lateral port, a plunger reciprocable in said filling cylinder across the lateral port thereof, a molding material supply chute communicating with said filling cylinder lateral port, a first hydraulic motor operatively connected to said injection plunger, a second hydraulic motor operatively connected to said filling plunger, a high pressure source of hydraulic fluid, a low pressure source of hydraulic fluid, means including a first valve for supplying high pressure or low hydraulic fluid to said first hydraulic motor, means including a second valve for supplying high pressure hydraulic fluid to said second hydraulic motor, means controlled by said injection plunger for operating said first valve to connect said high pressure source to said first hydraulic motor to advance said injection cylinder plunger, means for operating said first valve to connect said low pressure hydraulic source to said first hydraulic motor after completion of the advance stroke of the injection plunger to oppose the return stroke thereof, means effective upon completion of the advance stroke of the injection plunger to operate said second valve to supply hydraulic fluid to said second hydraulic motor to effect reciprocation of the filling plunger to introduce plasticized molding material from said filling cylinder into said injection cylinder and thereby cause return of the injection plunger, and means effective upon completion of the return stroke of the injection plunger to operate said second valve to discontinue operation of said filling plunger and lock it against movement.

3. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port and having a lateral port, a plunger reciprocable in said filling cylinder across the lateral port thereof, a molding material supply chute communicating with said filling cylinder lateral port, a high pressure source of hydraulic fluid, a low pressure source of hydraulic fluid, a first two-port hydraulic motor operatively connected to said injection plunger, means adapted either to connect one port to the high pressure source or both ports to the low pressure source and including a first valve, a second two-port hydraulic motor operatively connected to the filling plunger, means including a second valve adapted selectively to connect said second motor ports alternately to said high pressure source to effect reciprocation of said filing plunger or to block both said ports to hold said filling plunger stationary, and control means effective first to set said second valve in position to hold said filling plunger stationary and said first valve in position to connect said high pressure source to said one port of the first hydraulic motor to advance said injection plunger and second to set said first valve in position to connect said low pressure source to both ports of said first hydraulic motor to oppose return of said injection plunger and third to set said second valve in position to effect reciprocation of said filling plunger to introduce plasticized molding material from said filling cylinder into said injection cylinder until full return of said injection plunger under pressure exerted by the introduced molding material and fourth to reset said second valve in position to hold said filling plunger stationary.

4. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port and having a lateral port, a plunger reciprocable in said filling cylinder across the lateral port thereof, a molding material supply chute communicating with said filling cylinder lateral port, a high pressure source of hydraulic fluid, a low pressure source of hydraulic fluid, means including a first valve connecting said first motor to said high pressure and low pressure sources, control means for setting said first valve successively to supply high pressure fluid to said motor to advance the injection plunger and low pressure fluid to said motor to oppose return of said injection plunger, means including a second valve connecting said second hydraulic motor to said high pressure source, and control means including said injection plunger for setting said second valve to supply high pressure fluid to said second hydraulic motor to reciprocate said filling plunger after advancement of said injection plunger to charge said injection cylinder with plasticized molding material and subsequently return said injection plunger to original position and setting said second valve to prevent escape of hydraulic fluid from said second hydraulic motor to hold said filling plunger stationary during the advance stroke of said injection plunger, and means for rendering said control means operative.

5. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port and having a lateral port, a plunger reciprocable in said filling cylinder across the lateral port thereof, a molding material supply chute communicating with said filling cylinder lateral port, a first hydraulic motor operatively connected to said injection plunger, a second hydraulic motor operatively connected to said filling plunger, a high pressure source of hydraulic fluid, a low pressure source of hydraulic fluid, a first four-way valve having two ports connected respectively to said high pressure hydraulic source and said low pressure hydraulic source and two ports connected to said first hydraulic motor, a second four-way valve having two ports connected to said second hydraulic motor and a third port connected to said high pressure source, and control means for setting said valves to supply high pressure hydraulic fluid to said first hydraulic motor to advance said injection plunger and to said second hydraulic motor to hold said filling plunger stationary and subsequently setting said valves to supply low pressure hydraulic fluid to said first hydraulic motor to oppose said injection plunger return stroke and high pressure hydraulic fluid to said second hydraulic motor to effect reciprocation of said filling plunger to introduce plasticized molding material from said filling material into said injection cylinder and return said injection plunger to its original position under pressure exerted by the introduced molding material, and finally setting said second valve to discontinue reciprocation of and hold stationary said filling plunger upon arrival of said injection plunger at its original position.

6. In a molding machine, an injection cylinder having a nozzle at one end, a plunger reciprocable in said injection cylinder, a lateral port in said cylinder between said nozzle and the nearest point of approach thereto of said injection plunger, a filling cylinder of less capacity than said injection cylinder communicating with said injection cylinder lateral port, a plunger reciprocable in said filling cylinder across the lateral port thereof, means to advance said injection plunger, means to oppose the return stroke of said injection plunger, means to maintain said filling plunger stationary during the advance stroke of said injection plunger and to effect reciprocation of said filling plunger after the injection plunger completes its advance stroke, and means to discontinue reciprocation of and hold stationary said filling plunger upon return of said injection plunger to its original position.

7. An injection molding machine sub-combination comprising an injection cylinder and plunger, a system for ejecting flowing substantially pre-plasticized molding material, a connection conducting said material from said system into said cylinder and to the working end of said plunger when the latter is advanced, whereby to charge said cylinder with substantially pre-plasticized injection molding material, an actuator for applying variable advancing force to said plunger, and controls for said system and said actuator and causing operation of said system while reducing said force of said actuator at least enough to permit said flowing material to return said plunger by acting on its said working end while charging said cylinder with said material.

8. The sub-combination defined by claim 7 but further comprising a controller actuated by a predeterminable return displacement of said plunger and stopping operation of said system when so actuated and thus controlling the amount of said material charged by said system into said cylinder.

9. The sub-combination defined by claim 7 but with said controls reducing said force of said actuator to a predetermined positive advancing force sufficient to keep said material under compression while in said cylinder but insufficient to prevent said return of said plunger.

10. A pre-plasticizing injection molding machine including the combination of a die clamp, an actuator for operating said clamp to open and close the injection molding die parts, an injection cylinder and plunger with the former constructed to inject plasticized molding material into said die parts when they are closed and said plunger is advanced, an actuator for applying variable advancing force to said injection plunger, a pre-plasticizing cylinder and plunger with the former upon advance of the latter ejecting a flow of pre-plasticized molding material into said injection cylinder to the working end of said injection plunger when the latter is at an advanced position, a reciprocator for said pre-plasticizing plunger, and a control system for said injection plunger actuator, said control system reducing the advancing force it applies to said injection plunger, while permitting operation of said die clamp actuator and of said pre-plasticizing plunger reciprocator in a plunger advancing manner, to a force less than the force exerted in a return direction by said pre-plasticized material acting against said injection plunger's working end, whereby to in effect cause injection molding of said pre-plasticized molding material into said injection cylinder under a pressure related to said reduced advancing force applied said injection plunger.

11. The machine defined by claim 10 with said combination further including a control system for said pre-plasticizing plunger reciprocator and which includes a controller, actuated by a predetermined return displacement of said injection plunger, for stopping operation of said reciprocator, whereby to control the amount of said pre-plasticized material injection-molded into said injection cylinder.

RICHARD W. DINZL.

REFERENCES CITED

The following references are of record in the file of this patent:

UNITED STATES PATENTS

| Number | Name | Date |
|---|---|---|
| 2,107,190 | Shaw | Feb. 1, 1938 |
| 2,465,889 | Lester et al. | Mar. 29, 1949 |